Figure 1:
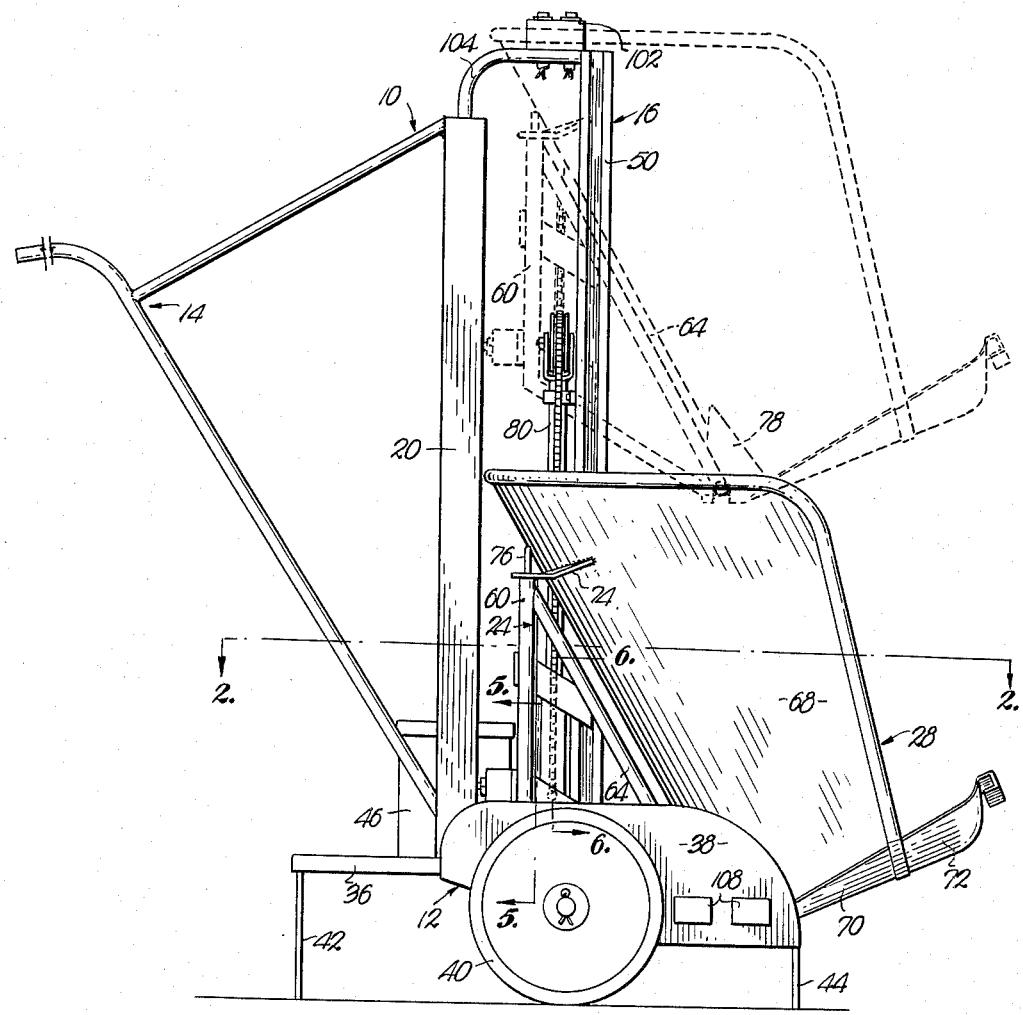

Oct. 12, 1965

W. A. REICH 3,211,257

HAND TRACK

Filed Jan. 28, 1964

2 Sheets-Sheet 1

INVENTOR.
Walter A. Reich
BY
Hovey, Schmidt, Johnson & Hovey
ATTORNEYS.

Oct. 12, 1965  W. A. REICH  3,211,257
HAND TRACK
Filed Jan. 28, 1964  2 Sheets-Sheet 2
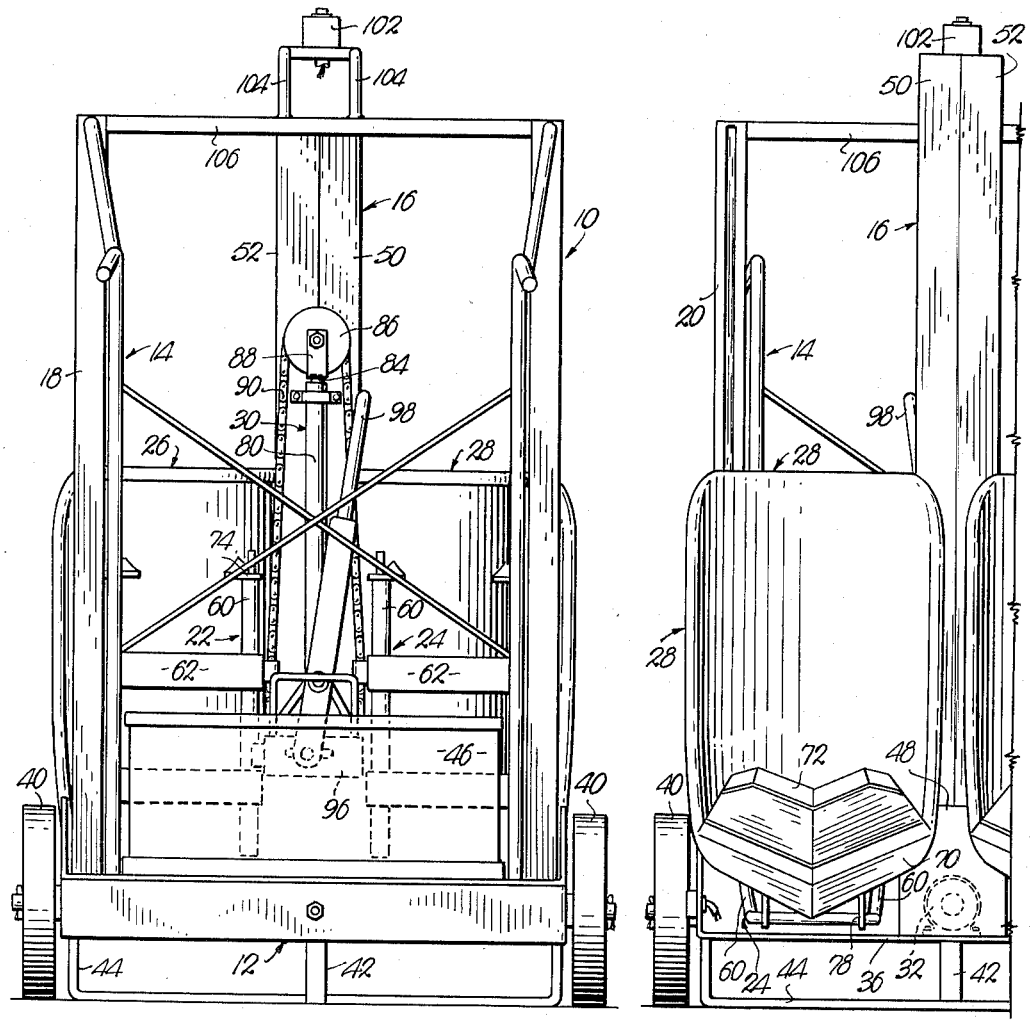
Fig. 3.  Fig. 4.
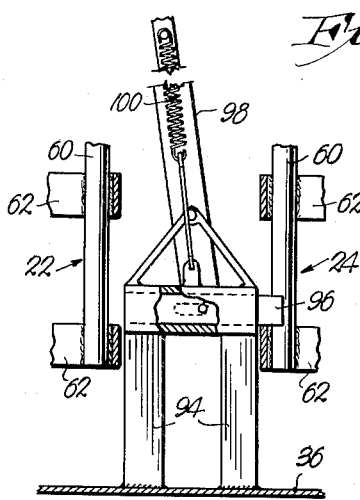 
Fig. 5.  Fig. 6.
INVENTOR.
Walter A. Reich
BY
Horey, Schmidt, Johnson & Hovey
ATTORNEYS

United States Patent Office 3,211,257
Patented Oct. 12, 1965

3,211,257
HAND TRUCK
Walter A. Reich, Kansas City, Mo., assignor to A. Reich & Sons, Inc., Kansas City, Mo., a corporation of Missouri
Filed Jan. 28, 1964, Ser. No. 340,773
10 Claims. (Cl. 187—9)

This is a continuation-in-part of my copending application Serial No. 153,565, filed November 20, 1961, and entitled "Hand Truck," now Patent No. 3,141,564.

This invention relates to a portable hand truck, and more particularly, to a hand truck for use in meat-handling operations such as those which take place in packing houses and similar establishments where large pieces of meat must be frequently handled.

It is the primary object of this invention to provide a hand truck for transporting and handling quarters and sides of meat, as well as any other large pieces of meat, which hand truck eliminates the necessity of the operator manually lifting or lowering the piece of meat.

It is a yet further important object of this invention to provide a hand truck which includes a pair of shiftable frames, each of said frames carrying a cradle, each cradle being capable of receiving a large piece of meat, whereby the hand truck may be utilized to transport at least two, and possibly more, pieces of meat.

Yet another important object of this invention is to provide a hand truck wherein said cradles are individually and selectively shiftable in a vertical path of travel, the cradles each being supported by a frame which is shiftably carried by a central upright assembly and a corresponding upright member.

Yet another important object of this invention is to provide, in a hand truck such as above described, means for actuating the frames which carry the cradles, said actuating means being operable by switches which are disposed at convenient and accessible locations upon the hand truck, the said switches also being arranged in such a manner that when the frames and the cradles carried thereby have reached a predetermined position in their respective upward paths of travel, the shifting movement of said frames will be terminated.

Yet another important aim of this invention is to provide a hand truck which has a pair of frames shiftably carried by a plurality of upright members, which upright members are supported by a wheeled base, the frames each being selectively shiftable in a vertical path of travel, there being means for determining which of said frames will be shifted, said means including a stop adapted to be interposed in the path of the frame which is not to be shifted, there being a lever for operating said stop, the said lever being easily accessible to the operator of the hand truck.

Yet another important object of the present invention is to provide a hand truck which has a wheeled base, the base carrying a plurality of upright members, said upright members being disposed in such a position that the same shiftably receive the frames which carry the cradles, there being a piston and cylinder assembly carried by said base in an upstanding, vertical position, said assembly having a pulley at one end thereof, there being means trained over said pulley, one end of said means being coupled to one of the frames, the other end of the means being coupled to the other of the frames whereby, when the piston and cylinder assembly is actuated by the operator of the hand truck, the same will serve to shift the selected frame, and therefore, the cradle carried thereby, from a position adjacent the base of the hand truck to a raised position whereby a piece of meat may be received or deposited within said cradle, said cradle then being shiftable to a lowered position as a result of the withdrawal of fluid from the piston and cylinder assembly whereby gravity will cause said cradle and frame to move to a lowered position.

Figure 2:
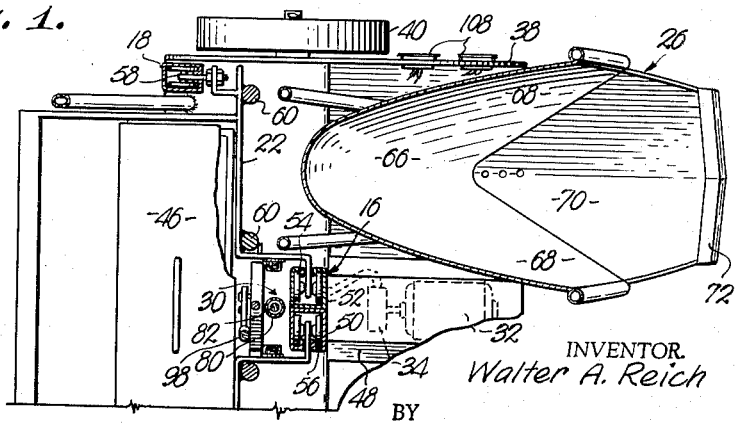

Other objects of this invention include details of construction of the hand truck and the components thereof including the frames and their corresponding cradles, as well as other details of the various structural components of the hand truck, said details being apparent from the accompanying drawings, wherein:

FIGURE 1 is a side elevational view of the hand truck with one of the cradles shown in full lines in a lowered position and in dotted lines in a raised position;
FIG. 2 is a fragmentary, sectional plan view of the hand truck taken on line 2—2 of FIG. 1;
FIG. 3 is a rear elevational view thereof;
FIG. 4 is a fragmentary, front elevational view thereof;
FIG. 5 is a view taken on line 5—5 of FIG. 1; and
FIG. 6 is a view taken on line 6—6 of FIG. 1.

The hand truck is broadly designated by the numeral 10 and includes as its primary components a wheeled base 12; a handle assembly 14; a plurality of upright members carried by said base 12, said upright members including a central upright assembly 16, and a pair of upright members 18 and 20 spaced from said central assembly 16; a pair of frames 22 and 24 shiftably carried by the upright assembly 16 and corresponding upright members 18 and 20; cradles 26 and 28 carried by said frames 22 and 24 respectively; and a piston and cylinder assembly 30 carried by said base and adapted to impart shifting movement to the frames 22 and 24. A motor 32 is also carried by the wheeled base 12, said motor driving a pump 34 whereby to supply fluid to piston and cylinder assembly 30.

The base 12 includes a bottom plate 36 having a pair of upstanding side flanges 38 whereby to define the base 12 in the nature of a bed, the base 12 being supported by a pair of large wheels 40 which are carried by stub shaft axles suitably secured to the base 12. A resting leg 42 is secured to bottom plate 36 along the normally rearmost edge thereof and assumes the configuration best shown in FIG. 3 of the drawings whereby, when the truck 10 is at rest it may be supported by the wheels 40 and the resting leg 42 in a substantially upright position. It will be appreciated that the length of the depending resting leg 42 may be altered so as to allow tilting movement of the hand truck 10 in a rearward direction, the leg 42 serving to limit said tilting movement. A front leg 44 is also carried by the base 12 whereby to limit forward tilting movement of the hand truck and to also serve as a support, if desired, for the truck when it is in a stationary position.

The base 12, and more particularly bottom plate 36 thereof, also supports a battery box 46 which receives the battery which provides the power source for motor 32, there being a suitable electrical coupling between the battery and the motor whereby power may be supplied to the motor to actuate the same and thereby pump 34. If desired, a housing such as 48 may be provided, the same being in the nature of a cover for the motor 32 and pump 34.

Extending upwardly from base 12 is central upright assembly 16, which assembly includes a pair of back-to-back channel members 50 and 52, the channel member 52 corresponding to frame 22 and receiving therewithin a roller assembly 54 which is carried by said frame 22, the channel member 52 defining a trackway for said assembly 54 whereby said assembly may ride freely within the channel member 52 as shifting movement is imparted to the frame 22. Likewise, the channel member 50 receives a roller assembly 56 which is carried by frame 24, the assembly 56 being shiftable within channel member 50 as movement is imparted to the frame 24.

In addition to being supported by the central upright assembly 16, each of the frames 22 and 24 is supported by corresponding upright members 18 and 20 respectively. Thus, viewing FIG. 2 of the drawings, it will be seen that the frame 22 carries a second roller assembly 58, which roller assembly 58 is received in upright member 18, said upright member being substantially U-shaped in transverse cross-sectional configuration whereby to define a trackway for roller assembly 58. Thus, it will be appreciated that frame 22 which carries cradle 26, is supported and guided, in any movement which may be imparted thereto, by the upstanding member 52 which receives roller assembly 54 and by upstanding member 18 which receives roller assembly 58. If desired, for suitable and sufficient support of the frame 22, a plurality of such roller assemblies may be provided whereby to insure that the frame 22 is maintained in its desired position with respect to its corresponding upright supporting members 52 and 18.

Likewise, the frame 24 is, in addition to being supported by upstanding channel member 50, supported by the upstanding member 20, which member is of the same cross-sectional configuration as member 18 and receives a roller assembly carried by frame 24, whereby said member 20 and member 50 cooperate to support, for shiftable vertical movement, the frame 24.

Each of the frames 22 and 24 is substantially triangular in configuration and includes, as best shown in FIGS. 1 and 3 of the drawings, a pair of spaced-apart, angular main braces 60; a plurality of crossbars such as 62 joining said main braces 60; and a pair of spanning members 64 which interconnect the ends of the main braces 60 whereby to define a pair of substantially triangular frames 22 and 24, each of the frames receiving their corresponding cradle 26 and 28 respectively.

The cradles 26 and 28 are substantially identical in construction and each includes an arcuate back portion 66, the back portions 66 having forwardly extending side portions 68; the cradles each also including a bottom 70, the front of each of said cradles being open whereby large pieces of meat may be easily inserted therewithin. Bottom 70 of each of the cradles extends forwardly whereby to present a lip 72, which lip bears the major portion of the weight of a piece of meat received by one of the cradles.

Each of the cradles has a pair of rearwardly extending lugs such as 74, which lugs have apertures therein whereby the same may be fitted over pins such as 76 which are presented by the normally uppermost free ends of the side members 60 of each of the frames 22 and 24. Also, each of the cradles 26 and 28 has a pair of rearwardly extending lugs such as 78 adjacent the bottom thereof, each of said lugs 78 having a notch formed therein whereby said lugs may be received over one of the crossbars which joins side braces 60 of each of the frames 22 and 24 respectively. Thus, each of the cradles 26 and 28 may be seated upon their corresponding frames 22 and 24 as by causing lugs 74 to engage pins 76 and the notches in lugs 78 to engage crossbars 62 whereby the cradles are each firmly seated upon their corresponding frames. If desired, the interconnection between lugs 74 and pins 76 may be such that, if it is necessary, the cradles may be swung about the lugs 78 whereby to allow the same to be swung forwardly and the contents dumped therefrom. If such a swinging movement is desired, it is also advisable to provide a catch for the rear of the cradle whereby it may be connected to its corresponding frame and also a limiting chain whereby the degree of tilting movement of the cradle with respect to the frame may be limited.

The piston and cylinder assembly 30 is positioned adjacent the central upright assembly 16 and at a point substantially intermediate the wheels 40 of the base 12 of the hand truck. The assembly 30 includes an outer tube or cylinder 80 and an inner tube or piston 82, the stem 84 of the piston having a pulley 86 rotatably mounted on the outer end thereof as by a bracket 88. A chain 90 is trained over the pulley 86 and a free end of the chain is secured to each of the frames 22 and 24 as by a rivet or the like as best shown in FIG. 6 of the drawings. Fluid is supplied to piston and cylinder assembly 30 by a pump 34 through a line 92 whereby, when the motor 32 is actuated to drive pump 34, fluid is delivered into the outer tube or cylinder 80 and beneath the piston 82 whereby to cause the piston to move upwardly and the stem 84 thereof to extend further outwardly and upwardly from the cylinder 80. As this is accomplished, an upward movement is imparted to the chain 90 which is trained over pulley 86.

In order that only one of the cradles may be moved upwardly at one time, a stop assembly is provided for the hand truck 10, said stop assembly being best illustrated in FIG. 5 of the drawings. Thus, there is provided an upstanding support 94 which carries a shiftable stop bar 96, said bar 96 being shiftable by a lever 98 to a position in engagement with one of the frames 22 or 24 respectively. In order that lever 98 and therefore bar 96 may be maintained in a position stopping the movement of the selected frame 22 or 24, a spring 100 is provided for the stop assembly.

Thus, when it is desired to move frame 22 upwardly for instance, the stop assembly is moved to the position shown in FIG. 5 whereby bar 96 engages one of the crossbars of frame 24 which is not to be moved. When the stop assembly has been so positioned, the motor 32 is actuated whereby to drive pump 34 and deliver fluid through line 92 into the interior of outer tube or cylinder 80 thereby driving piston 82 and its stem 84 outwardly and upwardly. As this is accomplished, and inasmuch as the frame 24 is being held against movement and therefore, the end of the chain 90 which is secured to said frame being prevented from movement, the upwardly directed force will be imparted to the frame 22 through chain 90, thereby causing frame 22 to move upwardly within its supporting and guiding members 52 and 18. Thus, when the means for imparting shifting movement to the frames of the hand truck is actuated, the frame which is to be shifted, will be driven upwardly from the full-line position shown in FIG. 1 of the drawings to the dotted-line position shown therein.

It will be appreciated that the frame may be stopped at a position intermediate the lower and upper ends of its path of travel merely by de-energizing motor 32. This is accomplished by means of suitable switches which are located at various positions on the hand truck 10. Thus, there is a switch 102 located at the uppermost portion of the hand truck and supported by a pair of braces 104 which serve to interconnect the upstanding channel members 50 and 52 with a crossbar 106, which crossbar 106 interconnects the uppermost ends of the upright members 18 and 20, the crossbar 106 also having the handle assembly 14 secured thereto as best shown in FIGS. 1 and 3 of the drawings.

Another switch 108 is located on each of the upstanding flanges 38 of the wheeled base 12 of the hand truck 10 whereby to provide actuating switches atop the hand truck and on each side thereof. This is desirable, for the operator in utilizing the hand truck 10, is likely to find himself, when in the process of loading meat thereinto or unloading meat therefrom, either behind the truck or on either side thereof when it is desired to actuate the motor 32 to drive one of the selected cradles 26 or 28 from a lowered position to a raised position or vice versa. To lower a cradle which has been raised, one of the switches of assembly 102 or assemblies 108 is actuated whereby to evacuate the fluid from within cylinder 80 or open a valve which permits the evacuation thereof under pressure, whereby the force of gravity resulting from the inherent weight of the respective cradle and its corresponding frame, will cause the cradle to move to a lowered position. In this respect, the roller assemblies which are associated with each of the frames 22 and 24 which carry the cradles 26 and 28 respectively, are provided with stop means whereby to limit the lowering movement of said frames and their corresponding cradles.

Likewise, suitable means is provided adjacent the end of the uppermost path of travel of each of the frames 22 and 24 whereby, when the frames have reached a predetermined position in their upward path of travel, the acuating switches will be automatically thrown to an "off" position whereby to prevent the further upward movement of the cradle and thereby any tipping movement of the hand truck which might result from the loaded cradle reaching a position which is too high with respect to the point of balance of the truck.

Thus, it will be appreciated that the hand truck 10 may be utilized to transport two large pieces of meat from a point of storage to a point of further storage or transportation, and that a single man may completely operate the hand truck 10 whereby to first actuate one of the cradles and load the same with a piece of meat, and the same then being lowered; the other cradle then being raised whereby it may be loaded and then lowered, the entire hand truck then being wheeled to a point of delivery of the meat whereby the meat may be unloaded from the cradles as they remain in their lowered position or, if it is desired to hang the meat from an overhead rack, hanger or the like, the cradles may be selectively and independently raised whereby to position the meat adjacent the hanger, all to the end that the meat will not have to be manually handled by an operator.

Having thus described the invention, what is claimed as new and described to be secured by Letters Patent is:

1. A hand truck comprising:
   a wheeled base;
   a plurality of upright members carried by said base, said upright members including a central upright assembly and a pair of upright members, each spaced from said central assembly;
   frames shiftably carried by said upright members, each of said frames being supported by said central upright assembly and one of said spaced upright members;
   a cradle carried by each of said frames;
   means for imparting shifting movement to said frames, said means including a piston and cylinder assembly, the stem of the piston being coupled to each of said frames; and
   means for selecting which of said frames will be shifted upon actuation of said means for imparting shifting movement thereto.

2. A hand truck as set forth in claim 1, there being means carried by said base for delivering fluid to said piston and cylinder assembly.

3. A hand truck as set forth in claim 1, there being a pulley rotatably carried by the free end of the stem of said piston.

4. A hand truck as set forth in claim 3, there being means trained over said pulley, one end of said means being coupled to one of said frames, the other end of said means being coupled to the other of said frames.

5. A hand truck as set forth in claim 4, said means for selecting which of said frames will be shifted, including a stop adapted to be interposed in the path of the frame not to be shifted.

6. A hand truck as set forth in claim 5, there being a lever for selectively operating said stop.

7. A hand truck as set forth in claim 6, there being means for terminating the shifting movement of each of said frames when the same has reached a predetermined position in its path of travel.

8. A hand truck as set forth in claim 7, each of said cradles having a rear wall, a pair of side walls, and a bottom, the front thereof being open.

9. A hand truck as set forth in claim 8, said cradles each being movably carried by their corresponding frames.

10. A hand truck as set forth in claim 9, there being a handle assembly for said truck, said handle assembly extending in one direction from said upright members, said frames and cradles extending in the opposite direction therefrom.

References Cited by the Examiner

UNITED STATES PATENTS

| | | | |
|---|---|---|---|
| 1,479,574 | 1/24 | Zetterlund | 187—28 |
| 2,493,824 | 1/50 | Noros | 187—9 |
| 2,560,131 | 7/51 | Sasgen | 187—9 X |
| 2,832,435 | 4/58 | Garapolo | 187—10 |
| 2,897,985 | 8/59 | Carlson et al. | 214—75 |
| 2,946,407 | 7/60 | Reich | 187—10 |

FOREIGN PATENTS 362,149  12/31  Great Britain.

SAMUEL F. COLEMAN, *Primary Examiner.*